(12) United States Patent
Kristensen

(10) Patent No.: US 6,209,395 B1
(45) Date of Patent: Apr. 3, 2001

(54) ACCELEROMETER

(75) Inventor: Brian Vissing Kristensen, Richmond (GB)

(73) Assignee: Bang & Olufsen Technology A/S, Struer (DK)

( * ) Notice: Subject to any disclaimer, the term of this patent is extended or adjusted under 35 U.S.C. 154(b) by 0 days.

(21) Appl. No.: 09/147,716
(22) PCT Filed: Aug. 25, 1997
(86) PCT No.: PCT/DK97/00343
  § 371 Date: Feb. 23, 1999
  § 102(e) Date: Feb. 23, 1999
(87) PCT Pub. No.: WO98/08102
  PCT Pub. Date: Feb. 26, 1998

(30) Foreign Application Priority Data

Aug. 23, 1996 (DK) .................................... 0891/96

(51) Int. Cl.⁷ ........................................ G01P 15/09
(52) U.S. Cl. ............................................ 73/514.34
(58) Field of Search ............................ 73/514.34

(56) References Cited

U.S. PATENT DOCUMENTS

| | | |
|---|---|---|
| 3,739,202 | 6/1973 | Cady . |
| 5,117,696 | 6/1992 | Schmid . |
| 5,373,213 | 12/1994 | Smith . |
| 5,490,421 | 2/1996 | Ueyanagi . |
| 5,677,487 | * 10/1997 | Hansen ................ 73/514.34 |

FOREIGN PATENT DOCUMENTS

| | | |
|---|---|---|
| 43 40 664 | 6/1995 | (DE) . |
| 918857 | 4/1982 | (SU) . |

OTHER PUBLICATIONS

Patent Abstracts of Japan, vol. 96, No. 2, Abstract of JP 8–35981 A (Kazuhiro Okada), Jun. 28, 1996.

* cited by examiner

Primary Examiner—Richard A. Moller
(74) Attorney, Agent, or Firm—Nixon Peabody LLP; David S. Safran

(57) ABSTRACT

Accelerometers frequently use piezoelectric elements which are subjected to compression or displacement, however rarely to bending, because asymmetries usually appear, which create signals from undesired influences as well. According to the invention this is avoided in a very symmetric construction with a number of mechanically biased bending elements (2) in the same plane, which are only supported at the ends and at the midpoints, where the electrical connections are also made.

16 Claims, 3 Drawing Sheets

ACCELEROMETER

BACKGROUND OF THE INVENTION

1. Field of the Invention

The invention relates to a transducer of the accelerometer type having an inertial mass and a piezoelectric bending element.

2. Description of Related Art

Accelerometers are particular in that it is the reaction from an inertial mass due to the movement of the housing which is measured, and there is hence no need for a fixed reference with respect to which a vibration is measured, such as in a microphone. It is at all times possible, by single or double integration, to obtain a function of time which corresponds to the velocity or position in the space where the measurement takes place.

Known accelerometer constructions use discs of piezoelectric material which build up a potential difference between the two sides by compression, by bending or by shear forces. In that the accelerometer comprising the housing and inertial mass contributes a mass which influences the measurement site, a construction becomes a compromise between sensitivity and in particular the inertial mass, because the mass of the housing must be minimised. For instance, an accelerometer for measuring acoustic signals on the human body may in practice frequently have a total mass approaching 30 g (0.03 kg), which can change the measured signal completely. Furthermore, many accelerometers are sensitive to other movements than those which occur along the axis of the accelerometer, thereby causing undesired signals. It is known to compensate certain directions of sensitivity by using a number of piezoelectric elements electrically connected to each other in a suitable fashion, such as DELTA-SHEAR (trademark) which has piezoelectric elements fitted to a prism with an equilateral triangle as a base and with individual inertial masses fitted to the far side. In this case the sensitivity is predominantly axial. However, this type is not suited for very low frequencies and low accelerations, whereas it is very well suited for extremely high accelerations.

SUMMARY OF THE INVENTION

It is the purpose of the invention to avoid the disadvantages which previously known accelerometers have caused in particular when performing measurements on the human body.

This is obtained in a construction which according to the invention is particular in that it comprises a number of identical beam-shaped piezoelectric bending elements disposed centrally symmetric in the same plane and being mechanically biased to bending. In this manner a high sensitivity is obtained while at the same time it is ensured that within the desired acceleration range do not result in loss of contact between the inertial mass and the bending elements which would be a source of grave distortion. Furthermore the fitting in the same plane eliminates the sensitivity to rotation around the axis of the accelerometer.

In a preferred embodiment of the invention the central parts of the intertial mass are disposed centrally symmetric and in mechanical contact with the midpoints of the beam-shaped piezoelectric bending elements. This embodiment is a further advantageous step to avoid influences which do not occur precisely in the axis of the accelerometer.

In a further preferred embodiment of the invention, the inertial plane of the inertial mass is displaced at most 3 times the thickness of the beam-shaped piezoelectric bending elements from their mutual neutral plane. The neutral plane means the plane in a beam in which there are neither compression nor dilatory forces when the beam is bent. In this there is furthermore obtained a reduction in the influence of rotation perpendicular to the axis of the accelerometer.

In a further embodiment the inertial plane of the inertial mass corresponds essentially to the neutral plane of the piezoelectric bending elements. Hereby there is obtained a complete elimination of both rotation and translation perpendicular to the axis of the accelerometer.

In a further advantageous embodiment of the invention the piezoelectric bending elements are supported symmetrically at their ends and at the midpoint on the opposite side by electrically conducting cylindrical wires fitted perpendicular to the longitudinal axes of the elements. Thereby a kind of knife edge bearing is obtained for each piezoelectric element, and it receives its mechanical bias by the central wire pressing against the element which is supported on the opposite side at the ends. Simultaneously the wires provide electrical connection to the two sides of the piezolectric element.

In a further advantageous embodiment each piezoelectric element is supported by a plastic holder which further fixes the electrically conducting wires. This construction permits a simplified assembly during manufacture.

In a further embodiment each piezoelectric element is supported at the ends by printed circuit board conductors from a supporting printed circuit board which furthermore establishes electrical connection to each piezoelectric element. By using a printed circuit board an electrical connection to each piezoelectric element is established without the use of conducting wires, which constitutes a simplification in manufacture.

In a further development of this embodiment one side of each piezoelectric element is connected electrically by means of a spring-loaded contact connected to the supporting printed circuit board, said contact being disposed essentially opposite the corresponding support on the supporting printed circuit board. In this way knife-edge bearings are obtained which are fully integrated with a printed circuit board, which constitutes a corresponding simplification in manufacture.

In a further embodiment each piezoelectric element is supported by cut-outs in the supporting printed circuit board. Thereby it is enabled to prepare a larger subassembly at a time, i.e. to fit all the piezoelectric elements and electrical connections, simultaneously providing the advantages of a special plastic holder in conjunction with wire-shaped electrical connections and supports.

In a further embodiment the housing used for the fixing of the piezoelectric element is built as a stressed-skin construction having a foam core. This construction is particularly advantageous in combination with the use of a piezoelectric element according to the invention, because a large stiffness and freedom from resonances are obtained, which cannot be obtained when traditional alloys are used.

BRIEF DESCRIPTION OF THE DRAWINGS

The invention will be further described in the following with reference to the drawing, in which.

DETAILED DESCRIPTION OF THE INVENTION

Figure 1:
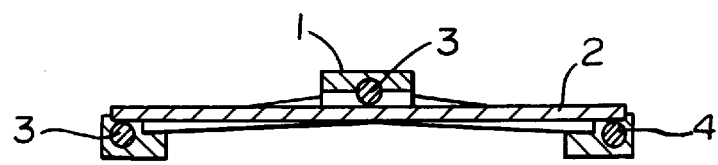
FIG. 1 shows a holder with a piezoelectric element according to one embodiment of the invention.

In FIG. 1 is seen a holder 1 for both a piezoelectric element 2 and its electrical connections 3, 4. These are simultaneously bearing with a line contact to the metal layer on either side of the piezoelectric element 2, and in order to obtain a construction which provides a mechanical bias for the piezoelectric element, there is furthermore fitted a short cylinder of the material of the connector opposite the connection 4. The material is typically goldplated copper.

When the piezoelectric element 2 is bent, the potential difference is established between the two metallised sides, and because all elements are series connected, there will appear on the one hand a signal which is the sum of the potential differences, and on the other hand there will be a considerable compensation of the voltages which are caused by skewed influences, whereby the accelerometer becomes most sensitive in the axial direction.

Figure 2:
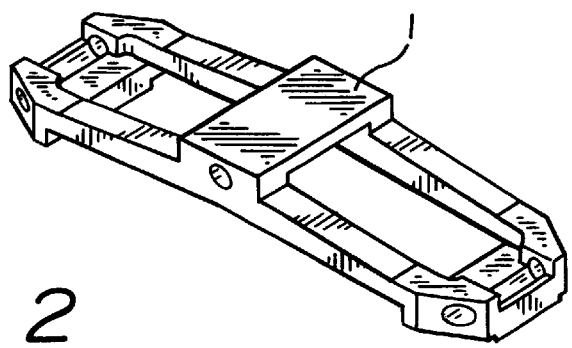
FIG. 2 is a detached view of the holder in dimetric representation.

In FIG. 2 the holder (1) in this embodiment is shown, which is made in a plastic in order to contribute as little as possible to the total mass.

Figure 3:
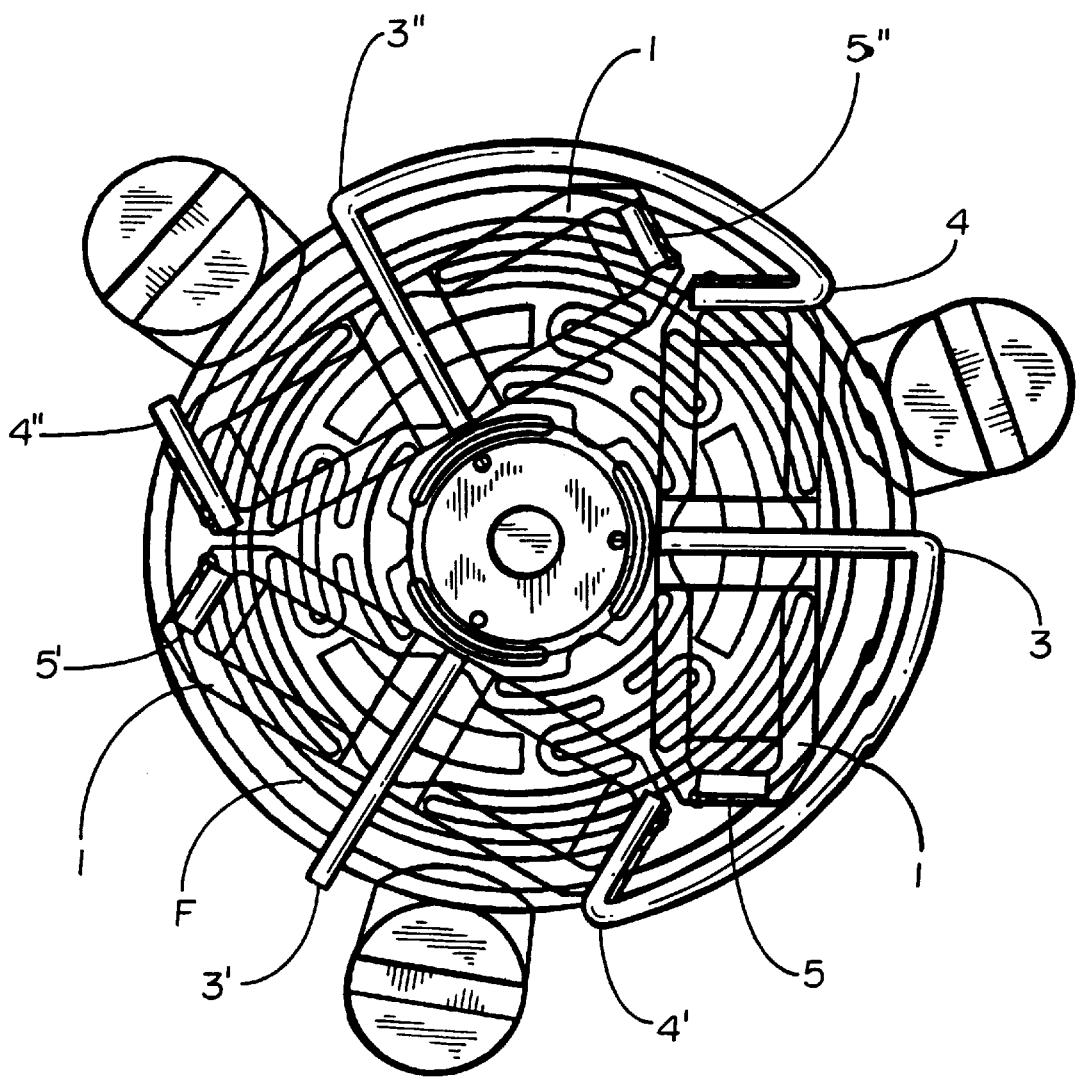
FIG. 3 shows a vertical projection of an assemblage of piezoelectric elements according to the invention.

In FIG. 3 is shown, how three piezoelectric elements (2) are fitted symmetrically around the axis of the accelerometer, and the bent connections are shown in thick black lines. The inertial mass which must only touch the centres of the piezoelectric elements is centered, in order to enable essentially only movements parallel to the axis, and these movements must occur against a very slight return force. This centering is performed by springs in planes above and below the piezoelectric elements. The upper spring F is shown as a meander-like pattern.

Each piezoelectric element (2) is connected by means of the wires (3, 4, 5), (3', 4', 5'), and (3", 4", 5"). 3" establishes connection to 4 and 3 establishes connection to 4'. 5, 5', 5" are short pieces of wire of a lenght which can be held in the holder 1, while 4" and 5' are longer and provide connections to the series connection oof the three piezoelectric elements (2). From these connections the signals obtained are taken through wires which do not contribute to distorting the oscillating system, to a housing which is not shown, from which there is a cable connection to e.g. a charge amplifier.

Figure 4:
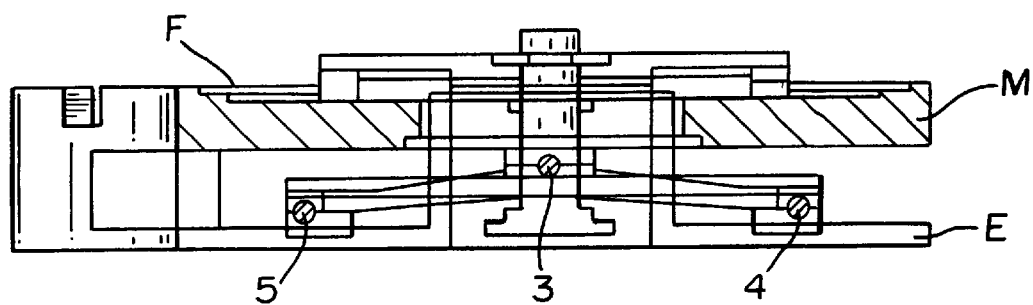
FIG. 4 shows the same assemblage from the side, and FIG. 5 in dimetric representation shows the use of a printed circuit board for supporting and establishing electrical connection to the piezoelectric elements.

In FIG. 4 it is seen how an inertial mass M is fitted in such a manner that it is in contact with the central point of each piezoelectric element, whereby the ends of these elements rest on an element E which is in contact with the surrounding housing which is not shown here.

Figure 5:
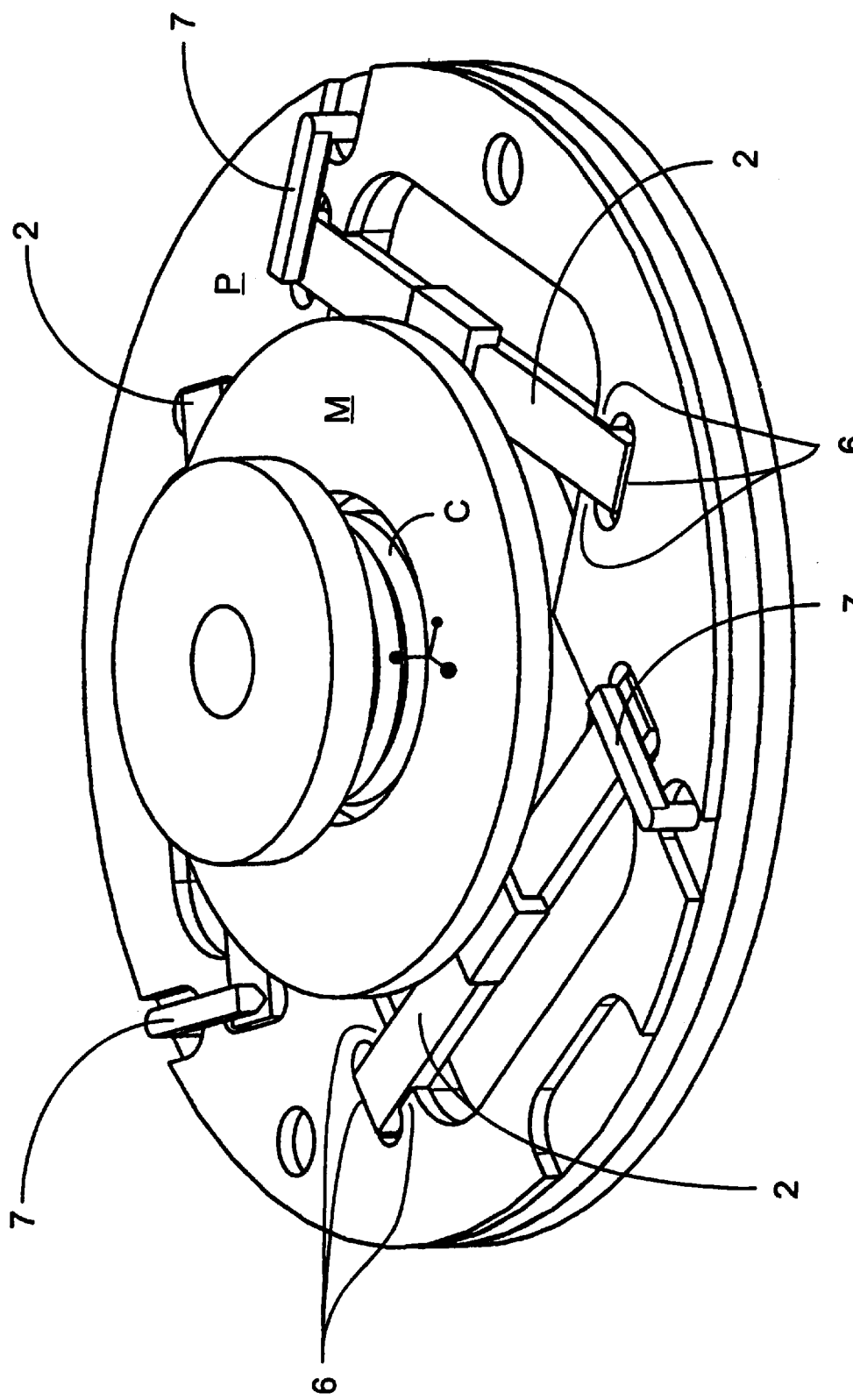

In FIG. 5 the piezoelectric elements 2 are shown supported in particular cut-outs 6 in a printed circuit board P. These cut-outs define between them a distance which is only slightly larger than the width of a piezoelectric bending element. On the lower side of the printed circuit board P there are connections (not shown) to the metallisation on one side of the piezoelectric bending elements 2, and on the other side resilient contact fingers which have a knife-edge establish both an electrical connection and fixing. The circuit board P may have two layers, one establishing electrical connections and axial support, and where the upper layer with its cut-outs support the piezoelectric elements sideways. The inertial mass M only touches the piezoelectric bending elements at their midpoints, and a spring C provides mechanical bias of the piezoelectric bending elements 2, by pressing via the inertial mass M against the midpoint of each element 2, whereby a mechanical stress is established against the lower side at their ends. In FIG. 5 no centering springs are shown.

What is claimed is:

1. Transducer of the accelerometer type having an inertial mass and a plurality of piezoelectric bending elements, comprising identical beam-shaped piezoelectric bending elements disposed centrally symmetric in the same plane and being mechanically biased to bending.

2. A transducer according to claim 1, wherein central parts of the inertial mass are disposed centrally symmetric and in mechanical contact with midpoints of the beam-shaped piezoelectric bending elements.

3. A transducer according to claim 2, wherein an inertial plane of the inertial mass is displaced at most 3 times the thickness of the beam-shaped piezoelectric bending elements from their mutual neutral plane.

4. A transducer according to claim 1, wherein an inertial plane of the inertial mass is displaced at most 3 times the thickness of the beam-shaped piezoelectric bending elements from their mutual neutral plane.

5. A transducer according to claim 4, wherein the inertial plane of the inertial mass essentially corresponds to the neutral plane of the piezoelectric bending elements.

6. A transducer according to claim 5, wherein each piezoelectric element is supported at ends thereof by printed circuit board conductors of a supporting printed circuit board which also establishes electrical connection to each piezoelectric element.

7. A transducer according to claim 5, wherein the piezoelectric bending elements are supported symmetrically on one side at an end area thereof and at a midpoint on an opposite side thereof by electrically conducting cylindrical wires fitted perpendicular to the longitudinal axes of the elements.

8. A transducer according to claim 7, wherein each piezoelectric element is supported by a plastic holder which also fixes electrically conducting wires.

9. A transducer according to claim 1, wherein each piezoelectric element is supported by a plastic holder which also fixes electrically conducting wires.

10. A transducer according to claim 1, wherein each piezoelectric element is supported at ends thereof by printed circuit board conductors of a supporting printed circuit board which also establishes electrical connection to each piezoelectric element.

11. A transducer according to claim 10, wherein one side of each piezoelectric element is electrically connected by means of a spring-loaded contact connected to the supporting printed circuit board, said contact being disposed essentially opposite a corresponding support on the supporting printed circuit board.

12. A transducer according to claim 11, wherein each piezoelectric element is supported by cut-outs in the supporting circuit board.

13. A transducer according to claim 10, wherein each piezoelectric element is supported by cut-outs in the supporting circuit board.

14. A transducer according to claim 13, wherein a housing is used for fixing of the piezoelectric elements, said housing having a stressed-skin construction with a foam core.

15. A transducer according to claim 1, wherein a housing is used for fixing of the piezoelectric elements, said housing having a stressed-skin construction with a foam core.

16. A transducer according to claim 1, wherein the piezoelectric bending elements are supported symmetrically on one side at an end area thereof and at a midpoint on an opposite side thereof by electrically conducting cylindrical wires fitted perpendicular to the longitudinal axes of the elements.

* * * * *